United States Patent [19]

Szanto et al.

[11] 4,270,970

[45] Jun. 2, 1981

[54] PUNCHING AND BINDING MACHINE

[75] Inventors: Elmer G. Szanto, Saratoga; Charles J. Ulrich, Santa Barbara, both of Calif.

[73] Assignee: Velo-Bind, Inc., Sunnyvale, Calif.

[21] Appl. No.: 149,984

[22] Filed: May 15, 1980

[51] Int. Cl.$^3$ .............................................. B32B 1/00

[52] U.S. Cl. ................................ 156/477 B; 11/1 R; 156/498

[58] Field of Search ............... 156/477 R, 477 B, 498; 11/1 R; 264/249; 24/221 K, 221 R,

[56] References Cited

U.S. PATENT DOCUMENTS

| | | | |
|---|---|---|---|
| 3,431,537 | 3/1969 | Klingenberg | 24/221 K |
| 3,756,625 | 9/1973 | Abildgaard | 11/1 R X |
| 3,811,146 | 5/1974 | Abildgaard | 11/1 R |

*Primary Examiner*—David A. Simmons
*Attorney, Agent, or Firm*—Julian Caplan

[57] ABSTRACT

An improvement on commercial machines which bind documents using plastic strips. The punch mechanism may be automatically actuated when the paper sheets are properly aligned on a punch platen or actuated manually at the user's discretion. Distance of the holes from the edges of the sheets may be indexed. The binding mechanism improvements include interchangeability of height of the pressure bar and speed of binding mechanism, depending on thickness of book to be bound or as selected by user, means for automatically starting the motor drive of the binding mechanism and pressure bar when it has been manually placed or moved onto the document to be bound, automatic lifting of the pressure bar when the binding cycle has been completed, a resistance-heated knife construction which reaches operating temperature more rapidly, controls and minimizes the heated knife temperature fluctuations, maintains a more uniform temperature profile of the knife, improvements in the mounting of the timing of the machine and improved means for securing and positioning the cooling and forming fingers in place. In a modification, means is provided for binding a "wrap-around" cover which extends rearward of the spine of the book and then is folded forward around the binding strips for the book. The means comprises a removable backstop for the spine edges of the sheets to be bound, a platen and roller to support the lowermost of the wrap-around covers and a rack to support the uppermost of the wrap-around covers during the binding procedure. The knife structure is modified to avoid interference with the modified means.

4 Claims, 23 Drawing Figures

PUNCHING AND BINDING MACHINE

This invention relates to a new and improved punching and binding machine and comprises improvements on commercially available machines. Reference is made to U.S. Pat. No. 4,079,647 on a sheet punching apparatus; the punch mechanisms hereinafter described are an improvement upon that structure. Reference is also made to U.S. Pat. No. 3,811,146 on machine for binding books, many of the mechanisms of which are incorporated in the present invention. Generally, the invention relates to a system for binding together, either temporarily or permanently, pluralities of sheets of paper, each formed with a series of spaced apertures adjacent one margin thereof using a first strip having studs which correspond in spacing to the apertures in the sheets and a second strip formed with holes aligned with the holes in the sheets to receive the studs. The present machine, as well as the predecessor machines, incorporate a pressure bar which applies pressure on the sheets of paper while pressing the strips toward each other, a knife, preferably heated, which cuts off the excess lengths of the studs and forms heads on the ends of the studs and, again preferably, means for cooling and setting the heads resembling rivet heads on the studs. Such machines have proven commercially successful.

In the machine hereinafter described there are both punching and binding functions, it being understood that these functions could be performed by separate machines having the features hereinafter emphasized. With respect to the punching mechanism, many of the elements thereof are disclosed in U.S. Pat. No. 4,079,647. One of the improvements of the present invention is that, instead of manual actuation of the punch, an electric motor is used to actuate the same. An automatic punch starting mechanism is electively employed. Thus, two switches or sensors are positioned with their actuators in the throat of the punch and located on opposite ends of the punch. Thus, when the paper to be punched is fully inserted in the throat of the machine assuring that the edge of the paper is parallel to the punch pins in the punch mechanism, both switches or sensors are closed. Still a third switch or sensor is located on a side edge guide for the machine and is closed when the paper is properly aligned with the edge guide which positions the opposite edge of the paper in relation to the pins in the punch. When all three switches or sensors are closed, the punch cycle is initiated. The edge guide switch is of particular construction hereinafter described in detail for the purpose of preventing damage to it and for insuring that the paper is flat on the platen of the punch before the edge guide switch is closed.

A further feature of the punch mechanism resides in the selective positioning of the punch backstop so as to punch the holes at different desired distances from the spine edge of the paper. For ordinary documents, the edges of the holes are spaced inward one-sixteenth of an inch from the spine margin, and these spacings are used with binding strips which are one-quarter inch in width. However, for certain purposes, typically binding computer print-out sheets, wider strips are used and the holes are spaced inward a slightly greater distance. Control of the distance from the spine is determined by a backstop in the throat of the punch. The present invention discloses mechanism under control of the operator for moving the backstop toward and away from the front of the machine to selectively control the location of the holes punched.

With respect to the binder mechanism, the present invention comprises improvements over U.S. Pat. No. 3,811,146.

Certain of the improvements relate to the pressure bar and its actuation. The pressure bar is a device which is slideably mounted in the machine and for much of its path of travel has a vertical direction. The pressure bar is manually moved from a position of rest into its vertical direction of movement and lowered or dropped until it contacts the uppermost of the plastic strips; and thereafter, by mechanical means, a predetermined pressure is applied against the uppermost strip thus compressing the sheets of paper, thereby controlling the ultimate tightness of the bound document.

One of the features of the present invention relates to the vertical height positioning of the pressure bar. The length of the studs of the first plastic strip commercially available varies upon the customer's needs—i.e., the maximum thickness of books to be bound. Further, the thickness of the sheets is another variable. The present invention provides means for positionally sensing the height of the pressure bar and the mounting therefor to accommodate different desired maximum thicknesses of books to be bound.

Another feature of the pressure bar mechanism is means for controlling the speed of the binding cycle of the machine, it being understood that it is desirable to bind sheets of paper more slowly for thicker books. The operator is provided with a selector switch for fast or slow movement of the binding mechanism or binding cycle time, but there is a further automatic override which prevents the operator from selecting the faster speed where a lower speed would produce a plastic rivet head configuration resulting in an improved bound document strength.

Still another feature of the invention is the provision of a switch which will automatically start the motor which drives the binding mechanism when the pressure bar has been lowered to a position where its lower edge is in contact with the uppermost strip.

A still further feature of the invention is the provision of a mechanism which automatically raises the pressure bar to its initial position of rest at the end of the binding cycle, thereby eliminating the necessity of the operator raising the pressure bar.

Another feature of the invention relates to the knife structure. In accordance with the present invention, the knife is resistance heated. A sandwich construction of a metal knife and on either side thereof resistance heating and insulation layer is disclosed and is preferred; a single heating layer being satisfactory but slower. Such a construction insures rapid heating of the blades of the knife to operating temperature, uniform heating of all of the knife blades distributed across the width of the machine or a uniform temperature profile derived by the design of the heating element pattern that compensates for irregular heat losses, and minimizes temperature fluctuations utilizing electronic circuitry and sensing and feedback circuitry of the temperature directly from the knife blade.

A further feature of the invention is an improved cam and cam-mounting system. A hexagonal or other regular or irregular cross-section camshaft other than round is employed, the shaft being mounted in bearings in the side frames of the machine. The cams are distributed along the length of the camshaft at proper locations and secured in position by snap rings or other means. When it is necessary to replace a cam, instead of disassembling the entire machine as was required in previous models, the snap rings for all of the cams and for the retainers on the ends of the shaft are removed and the shaft is withdrawn from the machine. A defective cam is replaced, and all of the cams are then reassembled and locked into position. Considerable time is saved in initial manufacture and particularly in maintenance in the field. Indicators are formed on the cams so that the cam profiles are properly aligned relative to the faces of the hexagonal shaft.

Still another feature of the invention is the provision of improved means for locking, guiding and positioning the fingers, which cool and set the formed heads on the severed ends of the plastic studs, which increases their shear strength, into a sliding channel which supports and guides the fingers. Again, considerable saving of time in initial installation of the fingers and replacement of fingers in the field is achieved.

The foregoing portion of this specification has related to a conventional book bound by Velo-Bind strips such as that shown in the aforementioned prior patents. Another type of book to which the present invention is applicable is the "wrap-around" cover. In this modified book, at the time of binding, the front and back covers extend rearwardly relative to the spine edges of the pages to be bound. After the covers have been bound along with the pages, the rearward extending portions are folded forward around the binding strips and, preferably, caused to adhere to end sheets of the pages which have been bound. To accept such covers, the backstop which normally limits rearward movement of the sheets to be bound is removable and is removed during fabrication of the wrap-around book. To support the lowermost cover rearward of the spine edges of the paper, a platen is installed and a roller is located to press the lowermost cover against the rear platen. Similarly, a rack is suspended above the platen to support the uppermost wrap-around cover.

It is, accordingly, a purpose of the present invention to provide means whereby either a conventional Velo-Bind document may be bound or the apparatus may be utilized to bind a book having a wrap-around cover.

A further feature of the invention is a modification of the knife structure used in fabricating the wrap-around cover. Knife blades which cut off the excess stud lengths are bent at an obtuse angle relative to the plate to which they are fastened, and the plate is disposed at a downward-rearward slanted angle. Hence, as the knife structure moves forwardly to cut off the excess stud lengths and then moves upwardly to form rivet heads, all of the knife structure is below the plane of the lowermost wrap-around cover and hence does not damage the cover nor does the supporting mechanism interfere with movement of the knife structure.

Other objects of the present invention will become apparent upon reading the following specification and referring to the accompanying drawings in which similar characters of reference represent corresponding parts in each of the several views.

In the Drawings

FIG. 1 is a top plan view of the apparatus with the upper exterior casing and certain parts removed for clarity purposes.

FIGS. 2, 3, 4 and 5 are sectional views taken substantially along the lines 2—2, 3—3, 4—4 and 5—5, respectively of FIG. 1.

FIG. 12A is a fragmentary sectional view taken substantially along the line 12A—12A of FIG. 11.

GENERAL DESCRIPTION OF MACHINE

Figure 1:
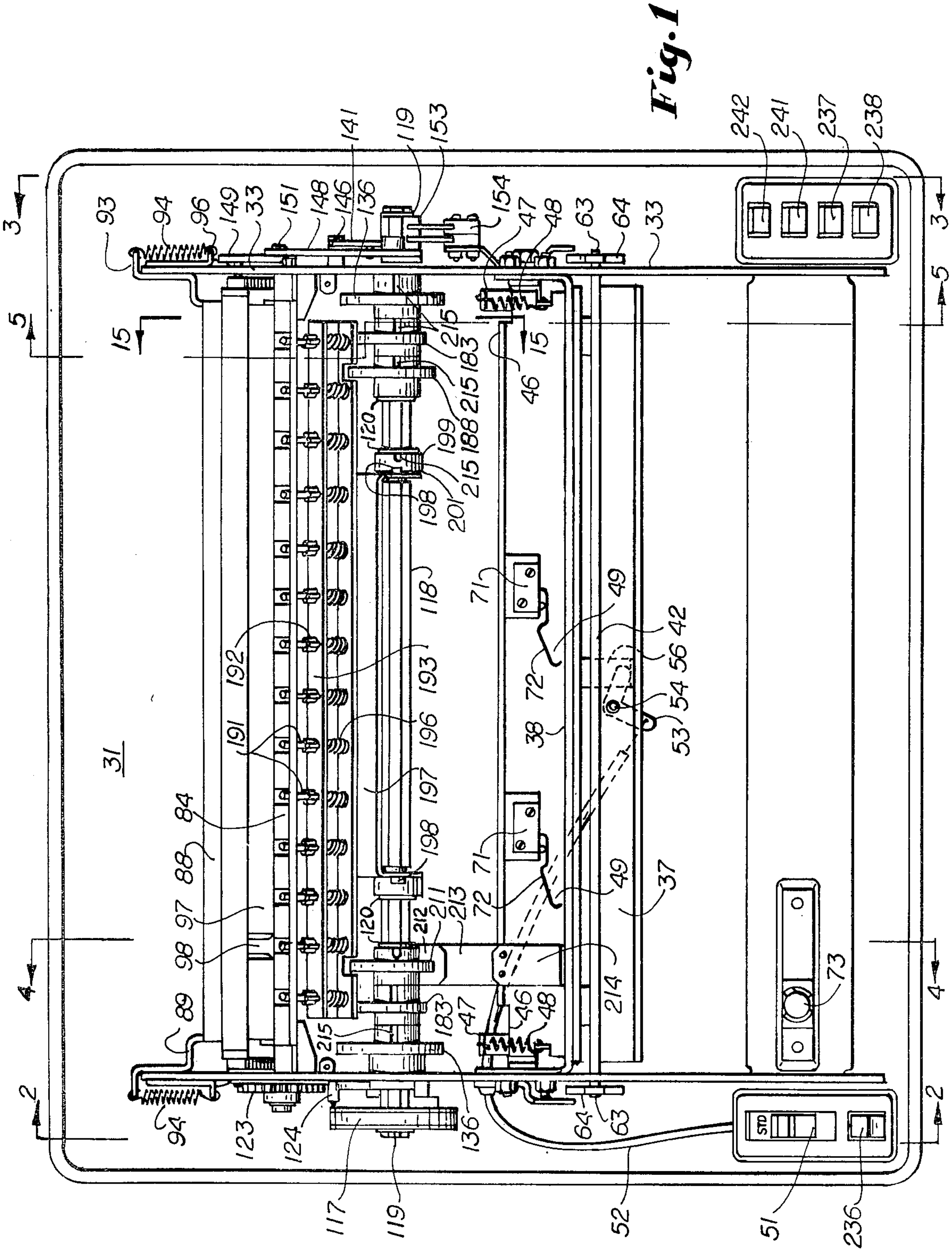
Figure 2:
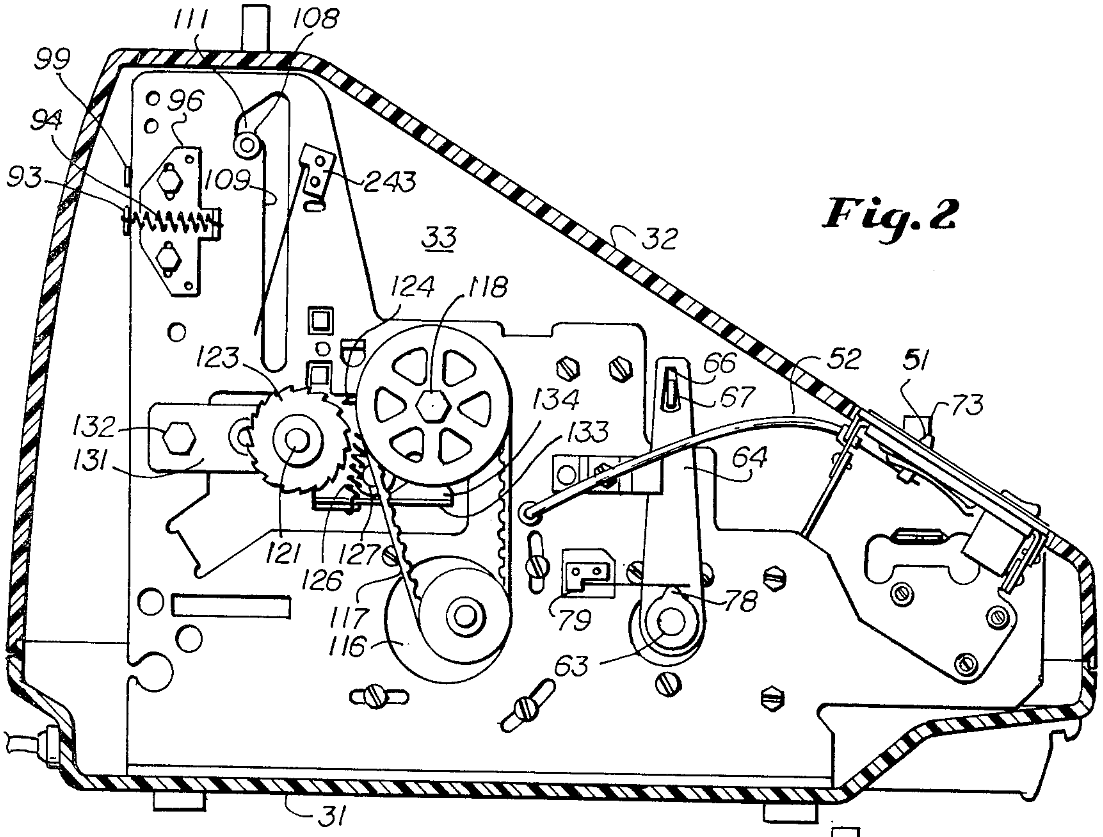

As is set forth in prior U.S. Pat. No. 3,811,146 among others, the present invention is intended to punch and bind paper 21 formed with spaced apertures 22 along one spine edge thereof. In accordance with the present invention, provision is made to locate the apertures 22 at either of two distances from the spine edge of the sheets of paper 21. If the sheets 21 are standard computer print-out sheets, the apertures 22 are spaced a greater distance from the spine edge of the paper than for ordinary or standard document binding. As appears in the discussion of the punching mechanism hereinafter set forth, provision is made for spacing the apertures at either of two distances.

In accordance with the present invention, a first strip 24 of plastic having studs 23 spaced at the same intervals as the apertures 22 is provided. The strips 24 may be of two widths depending upon the spacing of the apertures 22 from the edges of the sheets 21. There is also used in accordance with this system of binding a second strip 26 formed with holes 22 and counterbores or countersinks 28. Typical specifications for the material, sizes, etc., of the strips 24 and 26 are set forth in U.S. Pat. No. 3,811,146.

The machine of the present invention comprises a base 31 on which fits an ornamental molded casing 32 which houses the mechanisms hereinafter described. Within the sides of the casing 32 are vertical side plates 33 which are the main supports for most of the mechanisms hereinafter set forth. The side plates 33 are interconnected by various transverse, horizontal cross members 34.

The machine heretofore described performs two functions. The first is to punch apertures 22 in the paper 21. The second is to bind the paper 21 between the strips 24, 26. In a preferred embodiment of the invention, both the punching and binding functions are located within the same casing 32, but it will be understood that the two functions of the machine may be installed in separate machines.

PUNCHING MECHANISM

Extending horizontally, transversely near the proximal end of the machine and at a relatively low elevation, is a punch platen 36 on which the papers 21 are supported and positioned relative to the punch throat 41. Behind the inner edge of the platen 36 is a die plate 37 formed with holes corresponding to the spacing of the apertures 22. Plate 37 is located immediately rearwardly of the rear edge of the platen 36 and is horizontally aligned therewith. Vertical member 38 is an integral portion of the punch mechanism which also functions as a transverse, horizontal cross member 34 and is fixed to the side plates 33, and this carries a punch guide plate 39 which extends horizontally forwardly and then slants upwardly forwardly providing an entrance chute and provides a throat 41 between the plate 39 and the die plate 37. Punch plate 42 is vertically reciprocal relative to member 38 as hereinafter explained. A plurality of pins 43 corresponding in number to the holes in the die plate 37 are retained in punch plate 42 as is described in U.S. Pat. No. 4,079,647. Forwardly of plate 42 is a downwardly-rearwardly slanted paper deflector 44 which guides and deflects papers as they are inserted into the machine toward the throat 41. There is a vertical gap between the lower edge of plate 39 and plate 37 and horizontally reciprocal therein is a slide 46 which rests upon a slide support 47 fixed to side plates 33. Slide 46 is retained and guided by studs 29 fixed to die plate 37. Spring 48 biases the slide 46 rearwardly. Actuators 72 of switches 71 on slide 46 extend into throat 41 and trigger the electrical circuitry to actuate the punching mechanism when it is moved by the inward insertion of sheets 21. The stop means 49 is located on slide 46. By means hereinafter described, the slide 46 may be moved forwardly and rearwardly to control the spacing from the spine edge of the paper 21 to the apertures 22.

Extending through a suitable window in the casing 32 is a selector slide 51 which may be manually moved between two positions. The slide 51 is connected to a flexible cable 52 which extends to a lever 53 which is pivoted to a pin 54 on die plate 37. As the slide 51 is moved forward and rearwardly, the cable 52 causes a pivoting of lever 53. A forward extension 56 of slide 46 has a down-turned forward terminus in which is caught one of the arms of lever 53. Thus, the slide is moved forwardly and rearwardly to control the spacing of the apertures 22 as hereinafter explained.

The punch may be manually actuated by depressing control switch 238 or set by switch 237 to automatically trigger electrical circuitry when actuator 72, of switch 71, is moved by sheets of paper. The punch mechanism is motor driven by punch motor 61 which has extended shafts 62 having eccentric crank 63 on both ends. A vertical lever 64 has an aperture in its end which receives the eccentric crank 63. At the upper end of lever 64 is an elongated slot 66. An outward directed ear 67 is formed in punch plate 42 and is received within slot 66. Hence, as the motor 61 turns, the eccentric crank 63 causes the vertical lever 64 to reciprocate and thus to reciprocate the punch plate 42 and the pins 43 which are aligned with the holes in the die plate 37. Hence, paper in the throat 41 having its spine edge against the stop 49 is properly punched. Member 50 retains lever 64 in position.

In one form of the invention, the punch motor 61 is manually controlled by a switch. However, preferably, the punch may be made to perform automatically.

Thus, slide 46 carries two switches 71 having forwardly extending switch actuators 72 which extend into the throat 41 at its rearward end. The positions of the switches 71 and actuators 72 is dependent upon the position of slide 46 under the control of selector slide 51.

Figures 4, 9A, 9B:
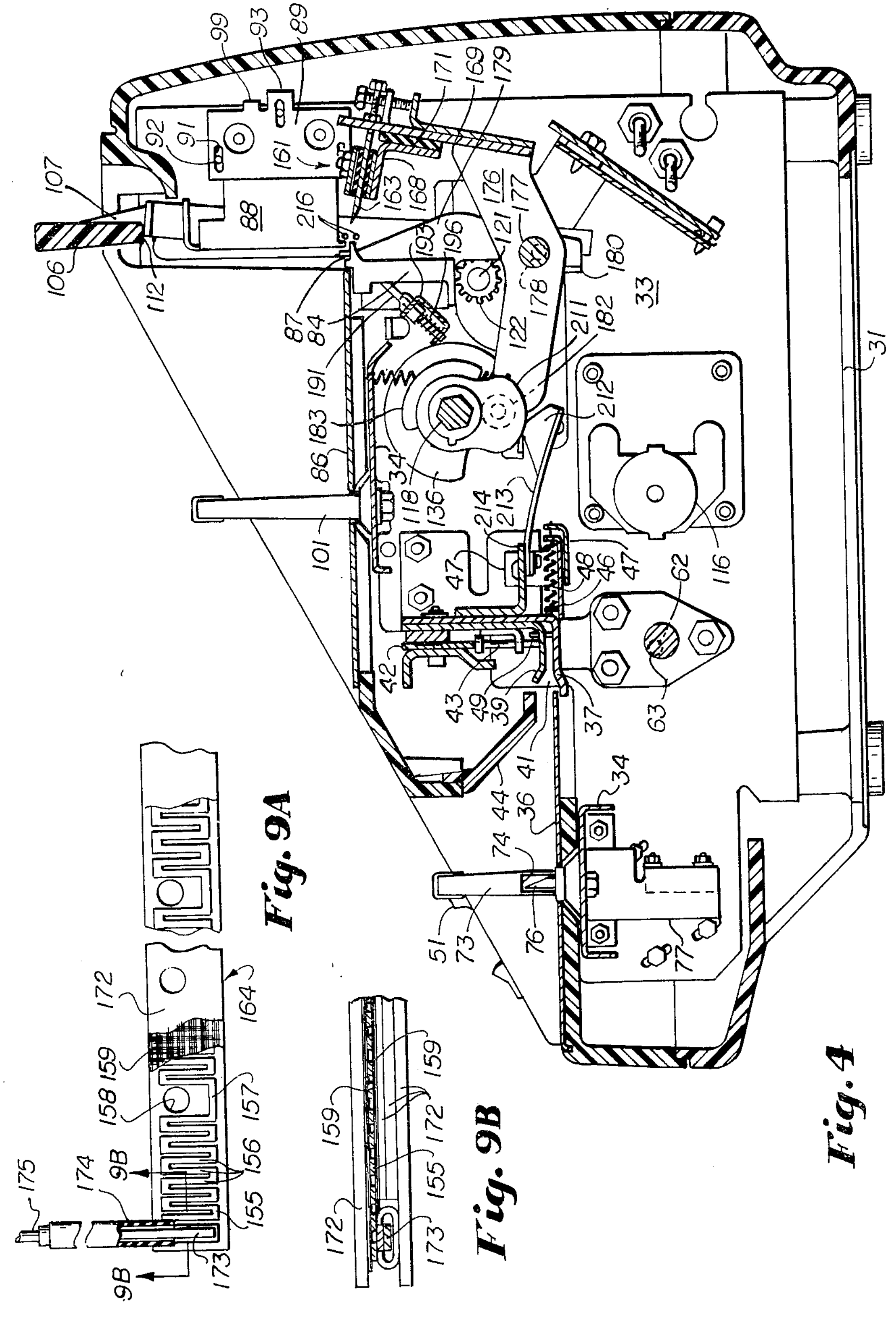
FIG. 9A is a fragmentary plan view of a heater element for the knife structure with portions broken away to reveal internal construction.
FIG. 9B is a fragmentary side elevational view of a portion of the structure of FIG. 9A.
Figure 5:
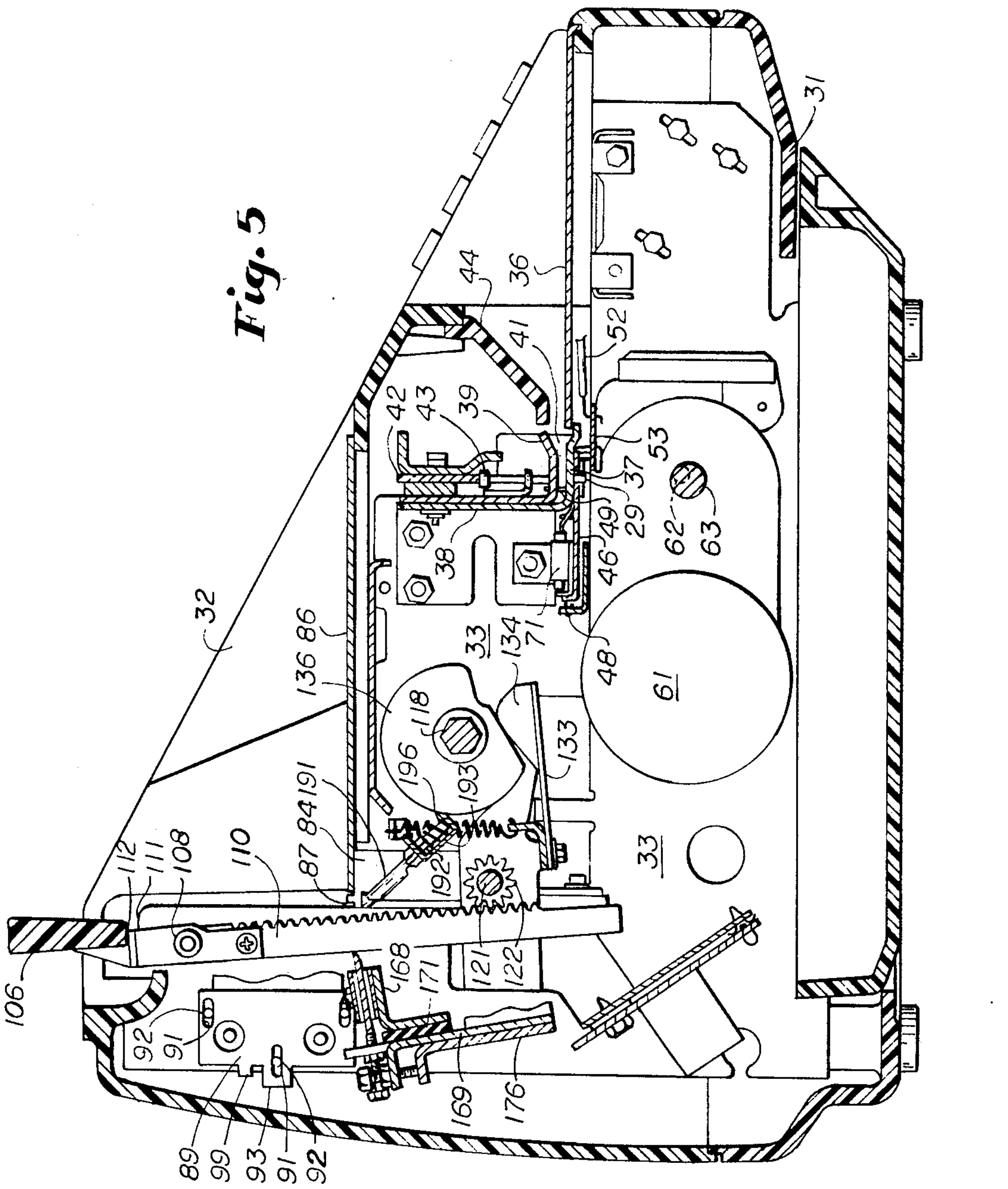
Figure 6:
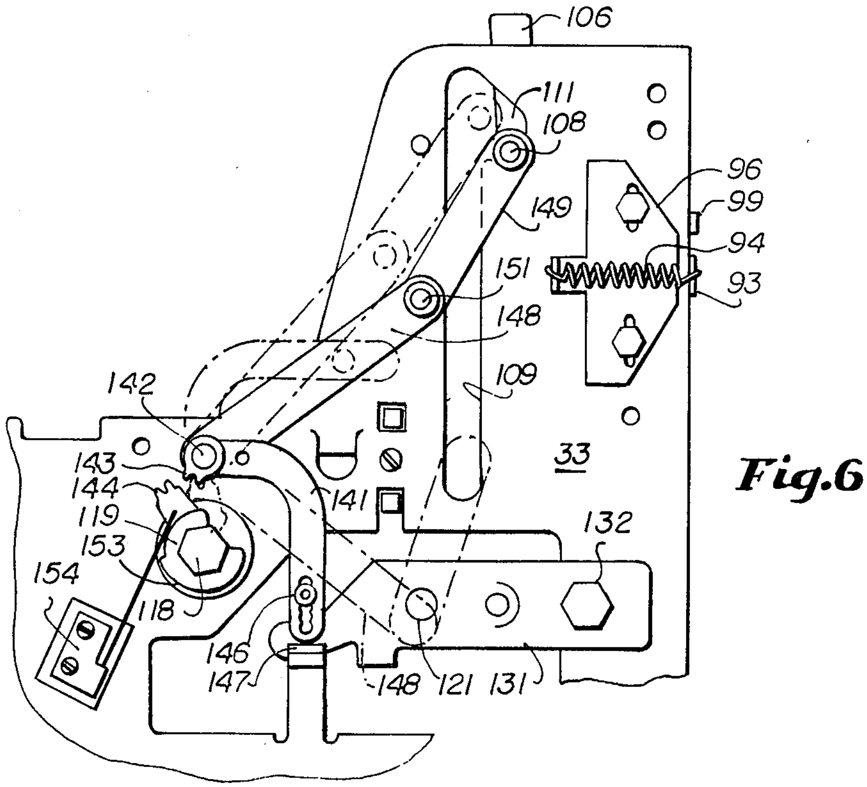
FIG. 6 is an enlarged view of a portion of FIG. 3 showing the pressure bar return mechanism in various positions of its cycle of operation.
Figure 7:
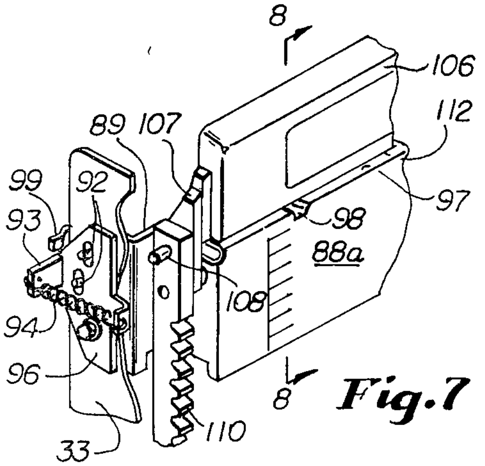
FIG. 7 is a fragmentary perspective view showing a portion of the bind backstop and associated mechanism where a short stack of paper is to be bound.
Figure 7A:
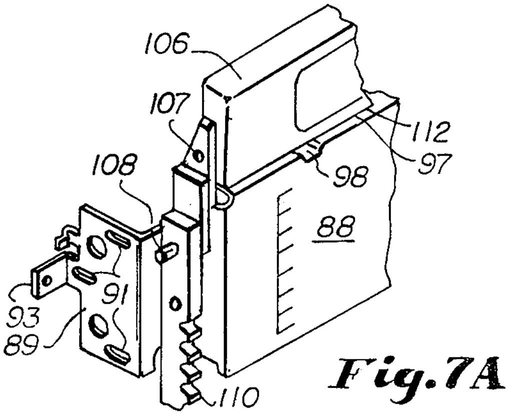
FIG. 7A is a view similar to FIG. 7 showing a taller backstop.
Figure 8:
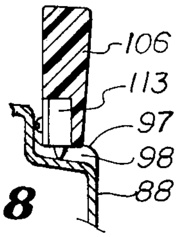
FIG. 8 is a fragmentary sectional view taken substantially along the line 8—8 of FIG. 7.
Figure 15:
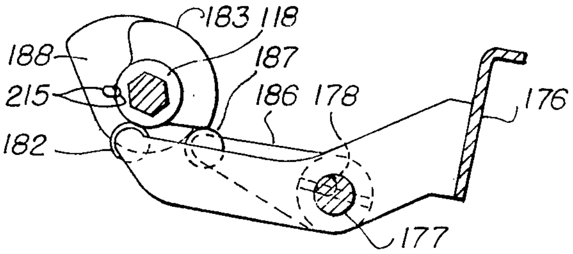
FIG. 15 is a view taken along line 15—15 of FIG. 1.
Figure 9:
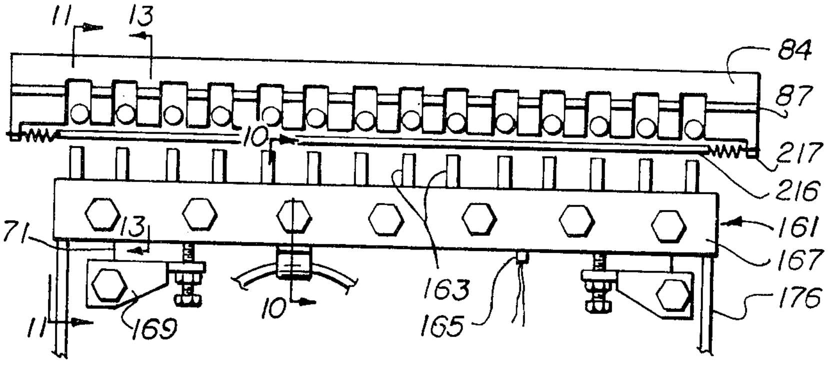
FIG. 9 is a fragmentary plan view showing the knife structure in retracted position and the bridge.
Figure 13:
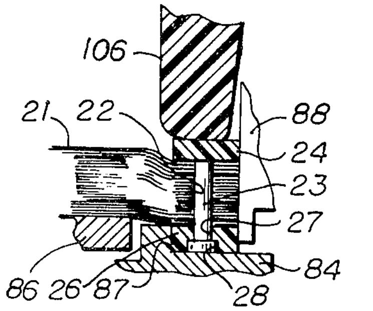
FIG. 13 is a fragmentary sectional view taken substantially along the line 13—13 of FIG. 9 showing a normal size binding strip.
Figure 19:
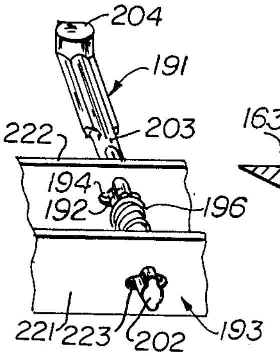
FIG. 19 is a fragmentary view of a cooling finger and its environment.
Figure 10:
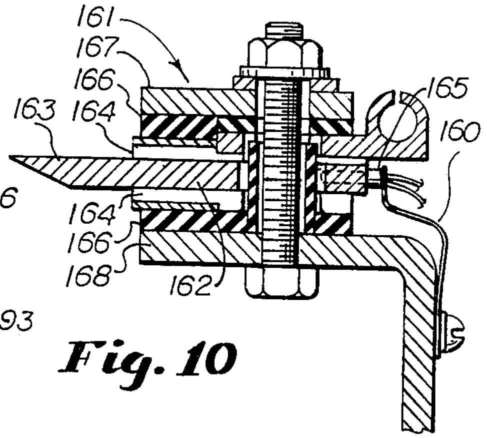
FIG. 10 is an enlarged sectional view taken substantially along the line 10—10 of FIG. 9.

An edge guide is located on the left side of the machine (although, of course, it might be located on the right side). This guide 73 is vertically upstanding and may be moved inwardly and outwardly relative to the center line of the machine to adjust for different lengths of sheets. The details of this adjustment are not herein illustrated or described since they are old in the art. The inward-facing edge of guide 73 is formed with an opening 74. Within the opening 74 is a third switch actuator 76. As shown in FIG. 4, actuator 76 is sloped downward at a 45° angle, forming a sharp point, while also being twisted at a 45° angle on its top edge. Thus, if paper is fed from the top, it will not jam or hang up on the edge of actuator 76. The tip of the actuator will be moved inside the opening 74. The actuator 76 is twisted 45° so that if paper is inserted from the front, it will not jam against the actuator but in both instances will move the actuator inward to actuate switch 77. If both switches 71 and switch 77 are closed, it is insured that the paper 21 is fully inserted in the throat 41 against the stops 49 and that the edge of the paper is located properly against the edge guide 73. Closing of all three switches assures paper length is parallel to pins 43 and perpendicular to other edges of paper and energizes the motor 61 and causes reciprocation of the lever 64 and a punching cycle.

Preferably, there is a cycle cam 78 on an eccentric crank 63 on one side of the machine which controls switch 79 and turns off the motor 61 after one cycle or one revolution of the motor shaft.

BINDING MECHANISM

As has previously been stated, the binding mechanism of the present machine resembles, in many respects, that of U.S. Pat. No. 3,811,146, and where the elements of the present machine are substantially the same as those of the preceding machine, they are not herein described in detail.

Extending horizontally across the width of the machine and supported by cross-members 34 is a binding platen 86, having at its rearward edge a depression or recess 87, at the level of the top of transverse bridge 84 which is secured at opposite ends to the side-plates 33. This depression 87 is shaped to receive strip 26. Rearward of depression 87 is a stop 88 which limits inward movement of sheets 21 supported by platen 86. As has been stated, the present machine may be provided with parts which are interchangeable to accommodate different heights of stacks of paper, such as, for example, a two-inch maximum stack and a three-inch maximum stack. Therefore, the stop 88 is a changeable part for the machine.

Stop 88 has a rearward and outward extension 89 formed with horizontal slots 91. Pins 92 fit through the slots 91 and are anchored in side plates 33. An ear 93 on extension 89 extends behind the rear edge of plate 33 and receives a spring 94 which is connected at its opposite end to spring anchor 96 on the side of plate 33 opposite extension 89. The function of spring 94 is to bias the stop 88 forward so that pressure is applied to strip 26 when it is placed in depression 87 and so that the tabs 99 (an extension of 88) contact side plate 33 to limit its forward movement. This is the normal position of the stop 88. As is described in the Punching Mechanism heretofore set forth, for certain types of sheets, the apertures 22 are punched at a greater distance from the spine edge of the sheets. When the latter sheets are used, a wider strip 26 is used than normal. Placing such a wider strip in the depression 87 forces the stop 88 rearwardly against the force of the springs 94. Hence, when the sheets 21 are pushed rearwardly to contact the stop 88, the holes therein are in proper relationship to the holes in the strip 26.

For purposes hereinafter described in detail, it will be noted that there is formed a depression 98 on top surface of 88 to provide clearance for the switch plunger, so it will not accidentally actuate the electrical circuitry to start the binding cycle.

Edge guide 101 on platen 86 is transversely moveable to accommodate different widths of sheets 21.

Figure 14:
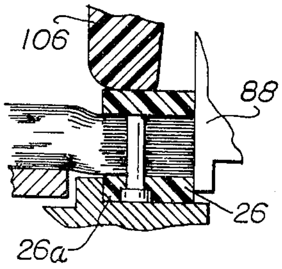
FIG. 14 is a view similar to FIG. 13 showing use of a wider than standard size binding strip used when paper sheets contain apertures farther distances from the edges.
Figure 12:
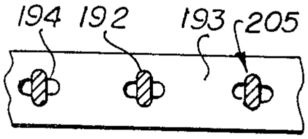
FIG. 12 is a fragmentary enlarged sectional view taken substantially along the line 12—12 of FIG. 11.

The first step in the operation of the binding mechanism, therefore, is to place a strip 26 of proper width, depending upon the positioning of the apertures 22 for the sheets 21 with which it is to be used, into the depression 87, thereby positioning backstop 88 correctly. Locating pin 102 (see FIG. 14) fits into a hole (not shown) in strip 26 to locate strip 26 laterally in depression 87. A stack of sheets 21 is then placed on the platen 86 against the edge guide 101 and against stop 88, thereby aligning the apertures 22 with the holes 27 in strip 26. Second strip 24 is then installed by inserting studs 23 through apertures 22 and 27.

PRESSURE BAR

A transverse horizontal, vertically moveable pressure bar 106 is provided. Again, to accommodate different maximum height stacks of sheets, the pressure bars 106 are interchangeable. Such interchangeability is preferably provided by using different brackets 107 which may be an integral part of pressure bar 106 and which are mounted to rack 110 on each side of the machine. A roller 108 fits into a slot 109 in side plate 33 and, at the top of the slot 109, there is a rearward offset 111. When the roller 108 is in the offset 111, the pressure bar 106 is held in upward position. However, when pressure bar 106 is lifted and moved forwardly so that the roller 108 slides down the slot 109, the bottom edge 112 of pressure bar 106 is brought into contact with the top of strip 24. Recessed into bottom edge 112 is a switch 133 which, when its actuator contacts strip 24, initiates the binding cycle of the machine. The function of depression 98 in the flange surface 97 is to prevent closing of switch 113 when the pressure bar 106 is in retracted position, with roller 108 in the offset 111.

Binding motor 116 is mounted on side plate 33 and, by means of a belt-drive 117, is connected to drive transverse horizontal hexagonal camshaft 118. Shaft 118 is supported between the plates 33 by bearings (not shown) and is held in place by snap ring retainers 119 at either edge.

Horizontal transverse floating shaft 121 carries pinions 122 which mesh with the teeth of the racks 110. Also on shaft 121 is ratchet wheel 123 which is engaged by pawl 124, biased into engagement with the ratchets 123 by springs 126. Pawl 124 is pivoted on pivot 127 to spring anchor 121. Shaft 121 is supported on either side of the machine by spring anchors 131, pivoted on pivots 132 which are mounted to the plates 33. On the forward ends of spring anchors 131 are flat springs 133 which carry cam followers 134 which are engaged by pressure cams 136 on shaft 118.

As shaft 118 revolves, follower 134, which engages pressure cam 136, is increasingly depressed, thus pulling rack 110 downward and causing pressure bar 106 to be forced against strip 24 until a predetermined pressure is reached, whereupon spring 133 flexes, and despite continued turning of cam 136, no greater pressure is applied to the strip 24.

To prevent unacceptable variations in acoustical noise levels caused by applying varying loads to the D.C. bind motor 116 as each cam performs its function as they rotate through the binding cycle, there is provided on shaft 118 a counter-pressure cam 211 which assures uniform loading onto motor 116. Cam follower 212 is mounted on spring 213 and fastened by attachment 214 to one of the cross-members 34. The follower 212 exerts a pressure on the cam 211 which counter-balances the forces imposed on the system by the binding mechanisms.

Figure 3:
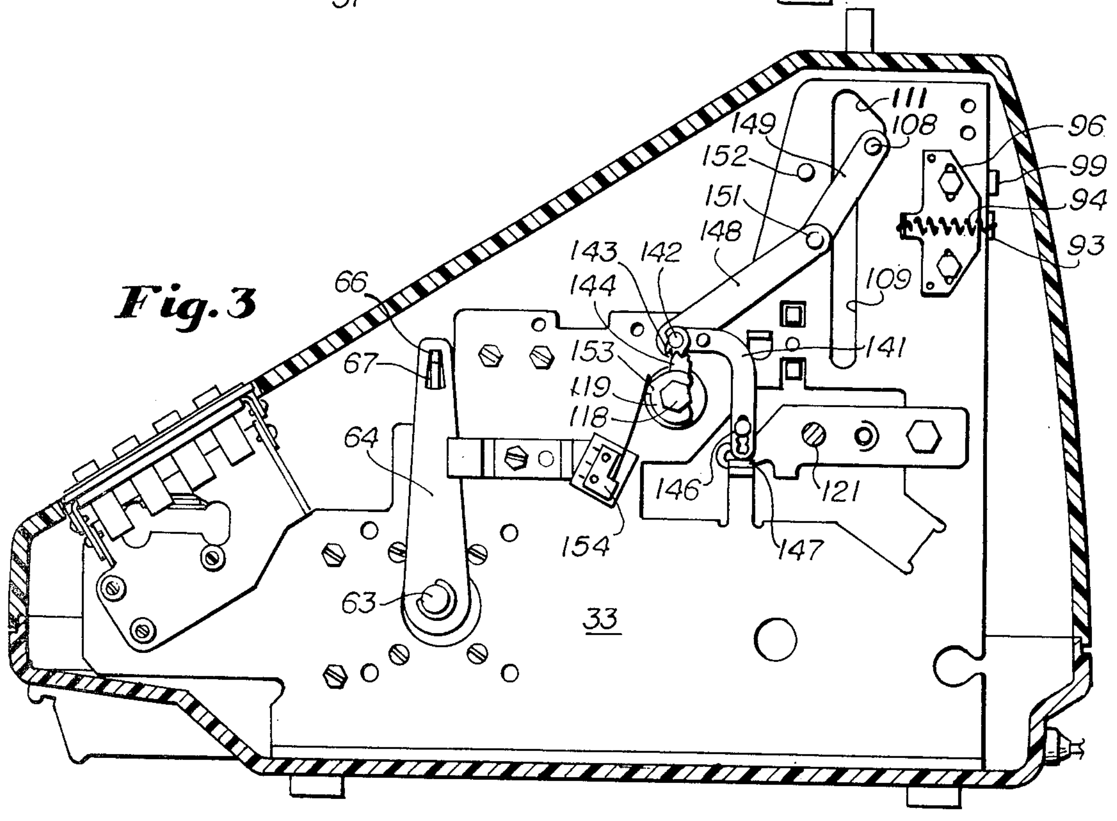

One novel feature of the present invention is the provision of means which automatically returns the pressure bar 106 to upper position. Return arm 141 is angular and is pivoted at pivot 142 to side plate 33. On its forward end there is a gear segment 143 consisting of approximately two teeth. Fixed for movement with shaft 118 is a meshing gear segment crank 144, also having approximately two teeth. Adjustably positioned on the lower end of return arm 141 is a roller 146. The rest position of arm 141 is determined by stop 147. Pivoted to plate 33 is a first pressure bar link 148 which is pivoted to second pressure bar link 149 by pivot 151. The upper end of link 149 is connected to the pressure bar by the same means as connects roller 108. There is a stop 152 fixed on plate 33 which limits clockwise movement of link 149 as viewed in FIG. 3.

As the binding cycle is completed, rotation of shaft 118 causes the driver gear segment 144 to mesh with gear segment 143, and this causes counter-clockwise rotation of return arm 141 about pivot 142. Roller 146 engages link 148 and oscillates it around the shaft of gear segment 143, and this causes link 149 to raise the pressure bar to upper position and drop the roller 108 into offset 111, causing pressure bar 106 to remain at rest position until the operator initiates the next binding cycle of the machine. Meanwhile, continued rotation of shaft 118 brings the gear segments 143 and 144 out of mesh with each other. Whereupon, return arm 141 drops to initial position with its lower end resting on stop 147.

Carried on shaft 118 is a cam 153 which engages the actuator of switch 154 after the gear segments 143 and 144 have ceased to mesh. Switch 154 stops the rotation of bind motor 116.

CUT-OFF

After the sheets 21 have been clamped between the strips 24, 26, continued turning of shaft 118 causes cutting of the excess lengths of the studs 23 projecting below the bottom strip 26. Mounted behind the depression 87 is a knife structure 161. Structure 161 comprises a cutter 162 having blades 163 projecting forwardly and spaced about the same distance as the studs 23. Above and below cutter 162 are heating elements 164 which are resistance heating sandwiches which are elevated in temperature when current flows therethrough. Heater element 164 is composed of several layers sandwiched together. The central conductor is cut from a sheet approximately 0.007 inches thick metal such as "Inconel". The pattern is composed of right angle bent, structures, as best shown in FIG. 9A, consisting of ends 155 parallel to the length of cutter 162 interconnected by longitudinal stretches 156 transverse thereto. To make provision for the bolts which bolt knife structure 161 together, holes 158 are formed in the heater element 164 and there are extended sections 157 to accommodate the space for the holes 158. On the top and bottom of the members 155–157 are sheets of asbestos cloth 159. On the outsides of the sheets 159 are sheets of mica 172 of a thickness of about 0.015 inches. As shown in FIG. 9B, on the side of the heater elements 155–157 closest to cutter 162 there is but one sheet 172 whereas on the opposite side there are several sheets 172. On each end of element 164 there is an outward extension 173 of nickle bonded to the outermost stretch 156. Extension 173 is surrounded by a glass fiber sleeve 174 which surrounds also the end of the conductor 175 and the connector between the conductor and element 173.

In a preferred heater element 164, at either end the widths of 155 and 156 are less than they are at the center. Thus at the end shown in FIG. 9A the stretches 156 are approximately 0.052 inches in width and the spacing between these widths is about 0.042 inches. At the center, however, the width of the member 156 is 0.054 inches whereas the spacing between the members 156 remains 0.042. The width change, although slight in dimension, alters the electrical resistance of the metal and consequently the heat or watt density. Hence more heat is generated at the ends of the sandwich but there is more heat loss at the ends. Thus there is a balancing which creates a uniform temperature across the entire length of the knife blades 163.

The cutter 162 temperature is sensed by means of a thermistor 165 that is inserted within the cutter and is retained under tension by spring wire 160. Above and below each heating element 164 is an insulator 166, and on top of top insulator 166 is a cover 167. Below the lower insulator 166 is a support bar 168 to which is attached a support bracket 169 insulated therefrom by a high temperature insulator 171. Each support bracket 169 is connected to pivot arm 176 which is pivoted about transverse horizontal eccentric shaft 177. The outer ends 178 of shaft 177 are received in brackets 179, dependent from bridge 84 and held in place by keeper plate 180. On the forward ends of pivot arm 176 are cam followers 182 which engage cutter cams 183 on camshaft 118. The cams 183 cause the knife support bar 168 to move about shaft 177 as a center and cut off the excess lengths of the studs 23.

To prevent build-up of plastic particles on the blade 163, a pair of vertically-spaced apart, transversely-extending wiper-wires 216 is mounted on holders 217 affixed to bridge 84. The blades 163 reciprocate between the wires 216, and the latter wipe off any accumulation of plastic particles. The wipers 216 are supported and tensioned by coil springs on either end. The wipers are of flexible plastic tubes with non-sticking surface characteristics loosely encasing wires 216. This enables a relative rotating motion of the tubes with the wires that assures a more positive wiping and cleaning action.

HEAD FORMING

Extending forwardly from shaft 177 is lift arm 186 carrying at its forward end follower 187 which engages lift cams 188 on shaft 118. The function of cam 188 is to cause the support bar 168 to be raised to deform the heated ends of the severed studs 23 and initiate the forming of heads thereon.

Cooling fingers 191 correspond in spacing transversely of the machine to studs 23. Each finger 191 has a first non-circular cross-section lower end 202, a circular cross-section portion 205 above portion 202, a second non-circular cross-section portion 192 above portion 205, a reduced diameter circular section 203 above portion 202 and an enlarged cross-section upper portion 204 above portion 203. The surface at the upper end 205 is angular to the center line of finger 191.

Figure 11:
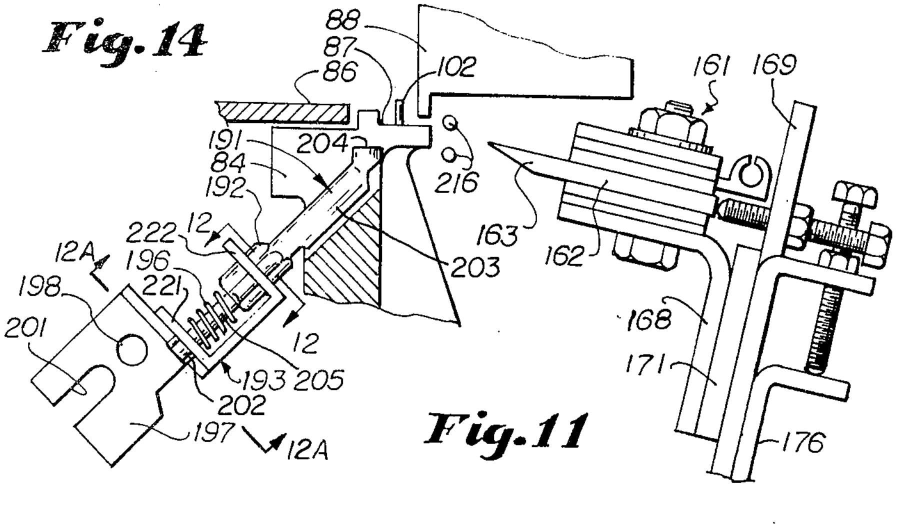
FIG. 11 is an enlarged sectional view taken substantially along the line 11—11 of FIG. 9.

Channel 193 reciprocates upwardly-rearwardly from the retracted position of FIG. 11 to a raised position with angular surface at the upper end 205 immediately below recess 87 in bridge 84 which is suitably apertured for passage first of blades 163 and then of fingers 191. The lower flange 221 of channel 193 is formed with first non-circular holes 223 complementary to ends 202. The upper flange 222 is formed with second holes 194 complementary to second portion 192. Springs 196 between flanges 221 and 222 surround fingers 191.

By inserting end 202 first through hole 194, then through spring 196 and then through hole 224 (as section 192 fits through hole 194) until section 203 is even with second hole 194 and then twisting finger 191 through 90°, lower end 202 locks behind flange 221. Spring 196 bears against section 192 and biases finger 191 upwardly-rearwardly. If finger 191 encounters resistance, spring 196 flexes so that finger 191 yields with a reciprocating sliding motion, rather than the finger remaining immobile and breaking. Spring 196 restores finger 191 to projected position when resistance to movement has been removed.

Extending forwardly from each end of channel 193 is bracket 197 which carries on its forward end cam followers 198 which engage cooling cams 199 on camshaft 118. As the cam 199 rotates, after the cutter blades 163 have been raised and lowered by reason of the shape of cams 188, the channel 193 is raised, causing the angular surface at the upper ends 205 of cooling fingers 191 to engage and set the heads at the ends of the studs and cool the same so that the strips are locked together a fixed distance apart. Bifurcations 201 extending downward from bracket 197 straddle and slip into grooves in shaft 118 to maintain the positioning of fingers 191 within slots in bridge 84.

The individual cams 136, 153, 183, 188, 199, 211 are formed with hexagonal holes through their hubs to receive shaft 118 and are located laterally by suitably-placed E-clips 120 fitting in grooves in shaft 118. By removing end clips 119 and the clips 120, the shaft 118 may be pulled axially outwardly, the cams dropping off. To facilitate proper replacement, each cam hub 136, 153, 183, 188, 199, 211 has either a projection or depression 215 and these are aligned as the shaft 118 is inserted, insuring proper cam positioning of their profiles.

OPERATION

At the commencement of operation, the operator pushes the main switch 236 which is located on one of the control panels on the sides of the machine. Although prepunched paper or paper punched by another machine may be used in connection with the binding portion of the machine, it will be assumed, for the purpose of this specification, that it is desired to punch appropriate holes 22 in sheets 21. One determination of the operator is the spacing of the apertures 22 from the spine edge of paper 21, depending upon whether regular paper or computer printout paper, etc., is being used. This selection is made by means of selector slide 51 on the control panel, as has heretofore been described, and this moves the slide 46 and the switch-actuator 72 inward and outward to determine how far into the throat 41 the spine edges of papers 21 may be inserted.

Another decision to be made by the operator is whether punching is to be done automatically or under manual control. This selection is made by means of the punch-mode switch 237 on the control panel. Assuming that a manual mode has been selected, the operator then inserts the sheets into the throat 41 resting on the platen 36 and preferably against the edge guide 73. Thereupon, the operator pushes the punch manual switch 238, and this energizes the punch motor 61 which reciprocates the punch-plate 42 so that the pins 43 punch the holes in the paper 21. At the end of one cycle, the cam 78 actuates the switch 79 which de-energizes motor 61.

Assuming that the punch operation will be automatic, punch-mode switch 237 is properly set for such operation. The selector slide 51 is positioned for the proper desired distance of the apertures from the spine edge of the paper. The sheets 21 are then laid on the platen 36 and inserted into the throat 41 and against the edge guide 73. When both switches 71 and switch 77 are closed by reason of proper positioning of paper 21, the motor 61 is energized, and the punching cycle is performed, continuing until the cam 78 opens switch 79 and turns off motor 61.

The first binding choice of the operator involves the bind-mode switch 241 which is for standard or rapid speed of binding. It is not desirable to use the rapid mode when the paper stack is high. Hence, paper height switches 243 are located with their actuators extending into the path of the pressure bar rollers 108. Unless the pressure bar has been lowered sufficiently so that the rollers 108 clear the actuators for switches 243, the machine overrides the operator's selection of the bind-mode as per switch 241.

The operator inserts a proper strip 26 into the depression 87, depending upon the spacing of the apertures 22 from the spine edge of the sheets 21. If the wider strip 26 is selected, the stop 88 is pushed rearward; if the narrower strips 26 are selected, spring 94 pulls the stop 88 forward. In any event, the spine edge of the paper 21 is pushed against the stop 88 and also against the edge guide 101. It will be observed from the foregoing discussion that different heights of stacks of paper may be accommodated. For example, the stop 88 may be at a height to accommodate either two-inch or three-inch stacks of paper. This selection is made at the factory or by a field serviceman and is not ordinarily performed by the operator. It is assumed that an appropriate stop 88 and also an appropriate pressure bar bracket 107 have been selected and these are coordinated.

The operator observes the ready light 242, also on the control panel which turns on when the heaters 164 have sufficiently heated the cutter 162, as determined by a thermistor 165. Prior to the cutter 162 being heated, "wait light" 244 signals the operator that the binding cycle is not operable.

Sheets 21 are placed on the platen 86 and pushed against the stop 88 and edge guide 101. The studs 23 of strip 24 are then inserted in holes 22 and 27 and strip 24 is pushed down. The operator then grips pressure bar 106 and pulls it forwardly out of the offset 111 and then downwardly so that the roller 108 rides in the slot 109. When the bottom edge 112 of pressure bar 106 contacts the male strip, switch 113 is closed, and this energizes the bind motor 116 which continues to cycle the camshaft 118 through one cycle.

The cycle of operation of the binding function of the machine has been heretofore described in detail in connection with the description of the various components thereof and is not here repeated. Completion of the cycle of revolution of the camshaft 118 returns the pressure bar to upper and retracted position through the operation of the elements 141–152.

Cam 153 actuates switch 154 to de-energize the bind motor 116 at the completion of the sequence of operations.

Figure 16:
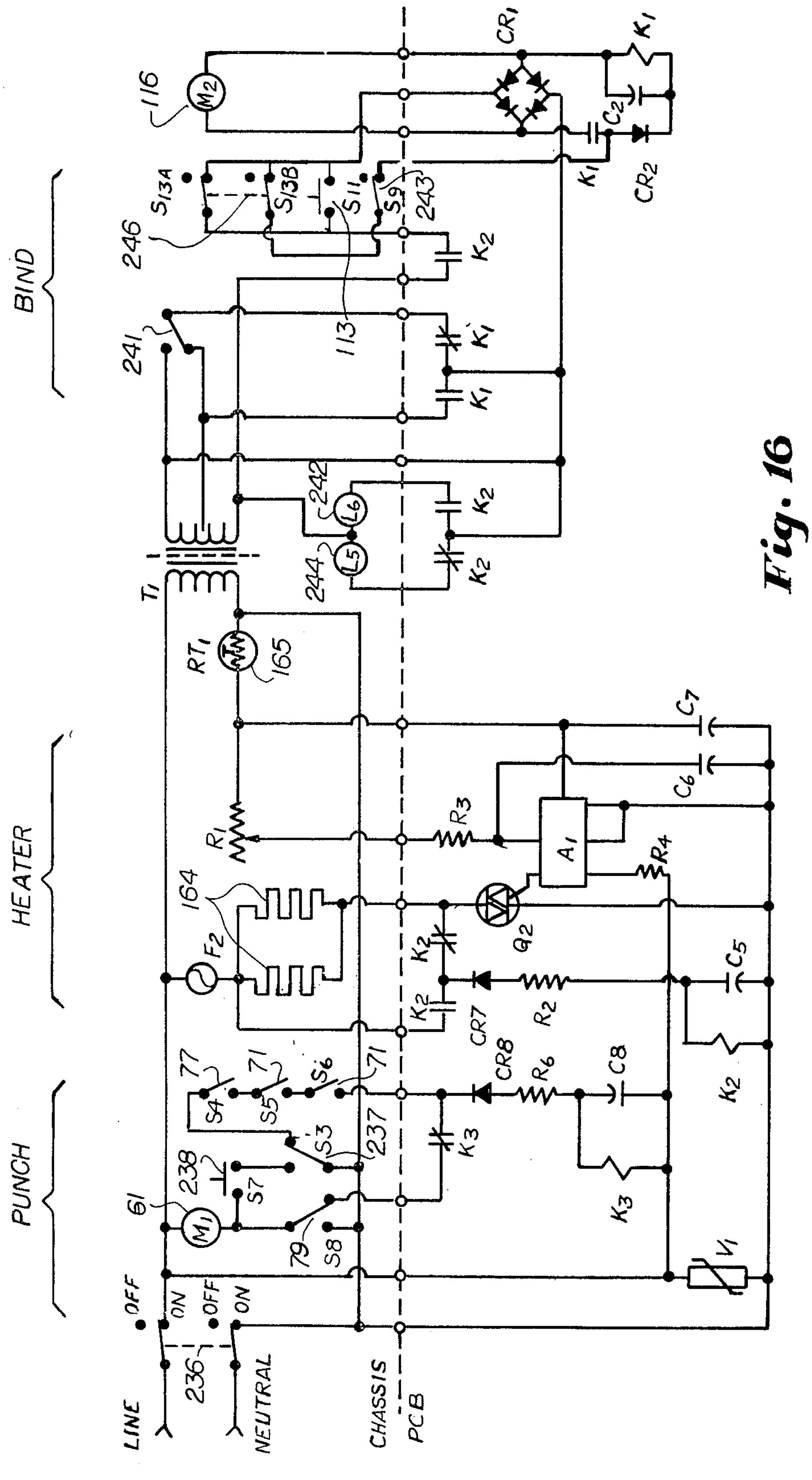
FIG. 16 is a schematic simplified wiring diagram of the machine.

Referring to FIG. 16, the essential electrical components of the machine are illustrated schematically and in simplified form. For practical purposes the following are representative values of components illustrated:

| | | |
|---|---|---|
| R | 1 | 2.5 K (max.) |
| | 2,6 | 1 K |
| | 3 | 1.5 K |
| | 4 | 10 K |
| C | 2 | 100 Micro f. (125 V) |
| | 5 | 10 Micro f. (200 V) |
| | 6 | 10 Micro f. ( 25 V) |
| | 7 | 10 Micro f. ( 50 V) |
| Q | 2 | Triac |
| CR | 1 | Bridge network |
| | 7,8 | IN 4004 |
| K | | Switching relays |
| RT | 1 | Thermistor - 1 milliamp at 1 M ohm |
| A | 1 | CA 3059 |

Strips 164 - comparable to:
Cat. No. ST 1018 of Hotwatt, Inc., Danvers, Mass.
Cat. No. HF-1514 of Ogden, Inc., Arlington Heights, Ill.
Cat. No. S-1405 of Chromalox, Inc., Pittsburgh, Pa.

Where the term "switch" is used herein, it will be understood that various sensors may be substituted.

MODIFICATION

Figure 17:
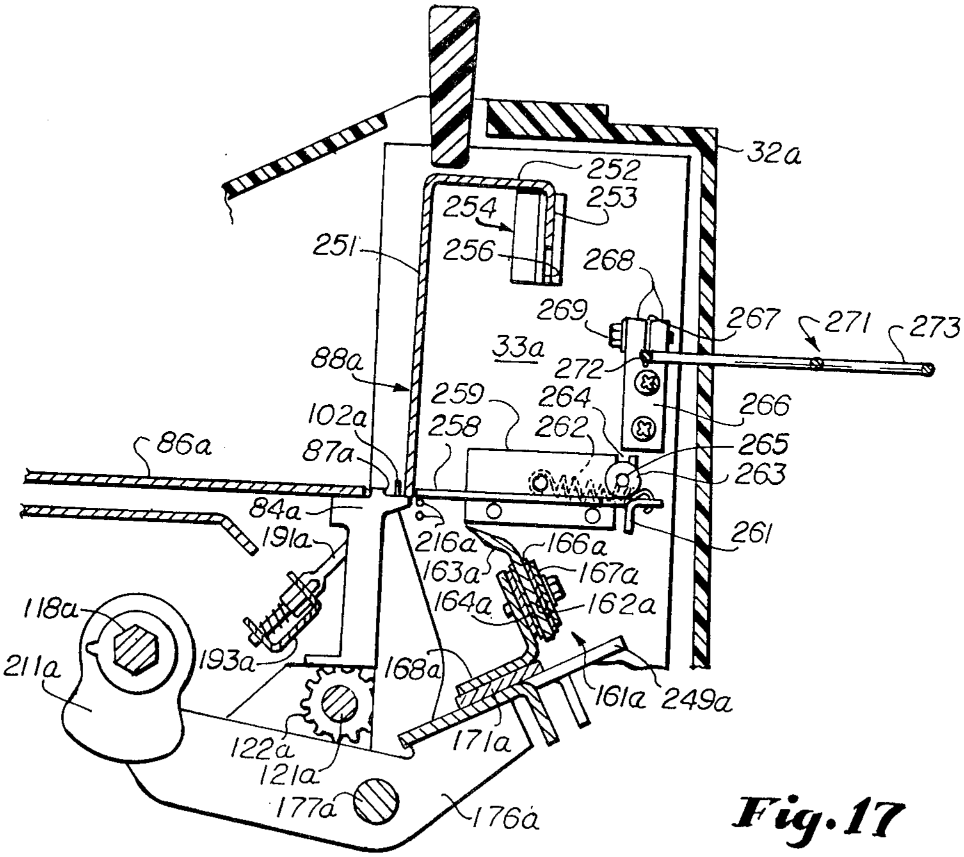
FIG. 17 is a fragmentary sectional view similar to a portion of FIG. 4 showing modification of the structure for wrap-around cover fabrication, the knife structure being in retracted position.
Figure 18:
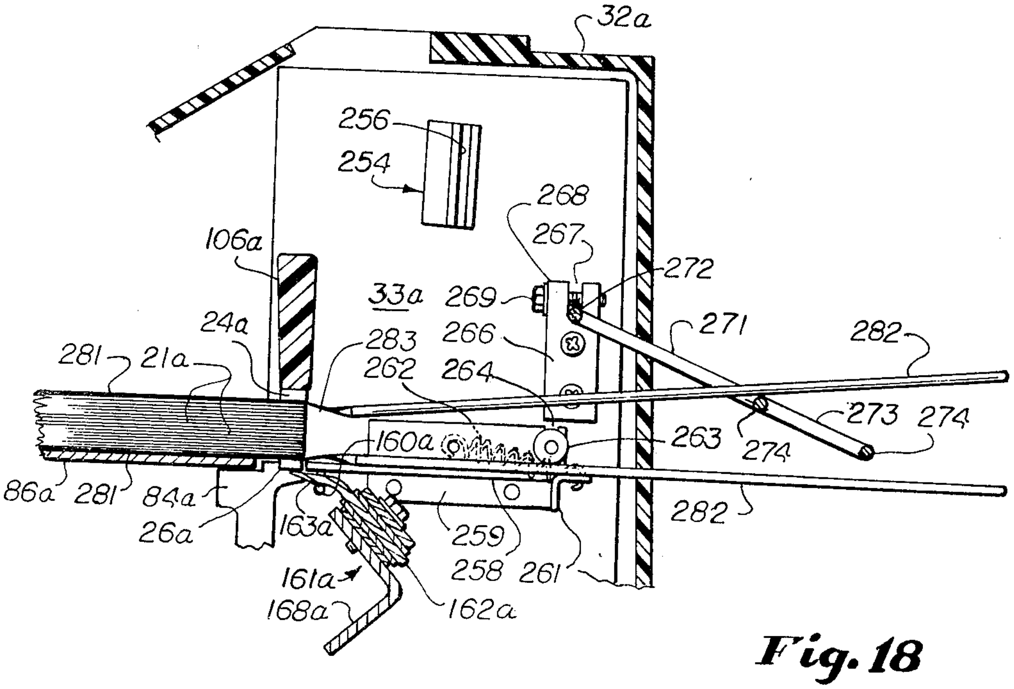
FIG. 18 is a view similar to FIG. 17 showing the knife structure in forward and raised position and showing the wrap-around cover support elements in a somewhat different position from those shown in FIG. 17.

The preceding modification has as its principal purpose the fabrication of a conventional VELO-BIND strip-bound document. FIG. 17 shows modification of the apparatus to accommodate a "wrap-around" cover type book. As shown in FIG. 18, sheets **21*a* are provided front and back with end leaves 281 which project rearwardly beyond the binding strips 24*a*, 26*a*, and are joined to front and rear covers 282. After the book is fabricated and removed from the binding machine, the covers 282 are folded forwardly, the connecting portions 283 which are rearward of the strips 24a, 26a, overlying the strips. If adhesive is applied to the end leaves 281, the insides of the covers 282 adhere thereto in the manner of conventional hard-bound books. Pressure sensitive end leaves, such as those shown in U.S. Pat. No. 3,749,423 may be used as the end leaves 281. Alternatively, instead of hard covers 282, soft covers such as those made of plastic, paper, or other materials integral with the end leaves 281** may be employed.

Modifications of the previously described apparatus may be substituted. Directing attention first to the knife structure 161a, the angular support bar 168a is connected to pivot arm 176a in the manner shown in FIG. 17. Blades 163a are disposed at an angle relative to cutter 162a. As the blades 163a move from the retracted position shown in FIG. 17 to the projected and raised position shown in FIG. 18, the cutter structure 161a is at all times below the plane of the lower strip 26a and thus does not contact or damage the lower cover 282.

An additional modification of the structure is that the paper stop 88a is removable. Stop 88a is formed with an elongated vertical section 251, an upper horizontal rearward extending section 252 and a downward rear vertical section 253. Attached to each of the side plates 33a is a stop bracket 254 which has a vertical slot 256 into which rear section 253 slides and against the top of which the horizontal section 252 rests. For production of the books which have been described in connection with the previous modification, the stop 88a is located in place as shown in FIG. 17. However, to make the wrap-around cover modification, the stop 88a is removed by sliding upward so that section 253 slides out of the slot 256. To faciliate removal, the pressure bar 106a may be moved forwardly from its start or rest position.

A third modification of the machine is the installation of a horizontal rear platen 258 behind bridge 84a and co-planar with the platen 86a. Bracket 259 attached to side plates 33a supports rear platen 258. Rearward and an integral part of platen 258 is a formed right angle flange 261. Spring 262 attached to flange 261 and bracket 259 biases the platen 258 which is being pulled by the spring forwardly of the machine. Hence, when an oversized strip 26a is installed, the spring 262 flexes to permit the platen 258 to move rearwardly a sufficient distance to accommodate such wider strip.

The rear of bracket 259 has a vertical downward slot 264 into which the shaft of roller 263 slips. Roller 263 rides on the top of lower cover 282 and holds it down.

Still a third bracket 266 is attached adjacent the rear of the machine and above the level of bracket 259. Bracket 266 is formed with a slot 267 on its top edge dividing the upper end 266 into bifurcations 268. Screw 269 straddles slot 267.

Rack 271 is formed of wire or other suitable material for the upper cover 282. Rack 271 has forward-outward directed ends 272 which fit into slots 267. Friction holds rack 271 in any angle of adjustment, such as the horizontal adjustment shown in FIG. 17 or the downward-rearward slanted adjustment shown in FIG. 18. The selected angle of rack 271 depends upon the thickness of the book to be bound. Sides 273 parallel to plates 33a are interconnected by cross bars 274 intermediate sides 273 and at the rearward end thereof. As best shown in FIG. 18, the lower edge of upper cover 282 rests on one or the other of the cross bars 274.

In use of the device, the paper stop 88a is removed by lifting same until rear portions 253 clear slot 256. A proper lower strip 26a is inserted in the recess 87a and positioned by pin 102a fitting into a hole in the strip 26a, as well understood in the art. The forward edge of rear platen 258 is biased by spring 262 against the rearward edge of the strip 26a. If strips wider than those shown in FIG. 18 are required, the platen 258 moves a corresponding distance rearward, stressing the spring 262.

Although it may be more convenient to preassemble the elements of the book before installing it in the machine, the individual elements may be assembled on the machine. First, the cover 282 is pushed rearwardly, resting on the rear platen 258 and under the roller 263 and thus being held horizontal as shown in FIG. 18. The end leaf portions 281 rest on platen 86a, and the holes (not shown) in end leaf 281 are aligned with the holes (not shown) in strip 26a. The sheets 21a are then placed on top of the lower end leaf 281, the holes therein again being aligned with the holes in strip 26a or end leaf 281. Thereupon, the top cover is installed with the top cover 282 resting upon one of the cross bars 274 of the rack 271 and the forward end leaf 281 resting on top of the sheets 21a. Again, the holes in the top end leaf 281 are aligned with the holes in the sheets 21a. The studs (not shown) of top strip 24a are then passed through the holes in the top end leaf 281, the sheets 21a, the lower end leaf 281, and the lower strip 26a.

The machine is then energized through one cycle of rotation of the shaft 118a as in the preceding modification. As shown in FIGS. 17 and 18, the knife structure 161a pivots about shaft 177a from the retracted position of FIG. 17 to the forward and then to the forward-elevated position of FIG. 18, cutting off the excess lengths of the studs and softening the stub end and forming heads on the stub ends. Cooling fingers 191a then engage the softened heads on the stub ends to cool and set the rivet heads, all as explained in connection with the preceding modification.

The book is then removed from the machine and the covers 282 folded forwardly, the connecting portions 283 wrapping around the strips 24a and 26a, and the covers 282 may be caused to adhere to the end leaves 281 as previously explained or such step may be omitted.

If it is desired to use the machine in fabricating books which do not have the wrap-around feature, the backstop 88a may be reinstalled to the position of FIG. 17. When the backstop 88a is in place, rear platen 258 exerts forward pressure against vertical section 251, which exerts pressure on strip 26a.

Many of the elements of the apparatus shown in FIGS. 17 and 18 are similar in function to those in the preceding modification, and the same reference numerals followed by the subscript a are used to designate corresponding parts.

We claim:

1. An apparatus for binding apertured sheets together using a first strip, a plurality of thermoplastic studs projecting from and spaced longitudinally along said first strip and a second strip formed with holes spaced longitudinally of said second strip at intervals complementary to said studs, said apparatus being of the type having a frame having a pair of spaced sides and a platen formed to receive said second strip and to support said sheets with their apertures aligned with said holes with said first strip above said sheets with said studs extending through said apertures and said holes and protruding below said second strip, means for severing said studs to length and heating the studs of said studs, the improvement which comprises a transverse, slanted channel, means for moving said channel from an inoperative position upwardly-rearwardly to an operative position, said channel formed with first non-circular holes in its lower flange and with second non-circular holes in its upper flange, a plurality of fingers detachably held in said channel, each said finger having a first non-circular cross-section at a first end of said finger complementary to said first hole, each said finger having a first non-circular portion at a first end dimensioned to fit through said first hole when in one position and to lock behind said lower flange when said finger is turned approximately 90°, a first round portion above said first non-circular portion and dimensioned to turn in said first hole, a second non-circular portion above said first round portion dimensioned to slide in said second hole and when in said second hole to restrain rotation of said finger, a second round portion above said second non-circular portion dimensioned to turn in said second hole and an operative portion above said second round portion and a spring surrounding part of each said finger, said spring bearing against said second flange and said second non-circular portion whereby when said finger is inserted in said holes and twisted 90° said finger is captured in said channel, said spring permit said finger to yield when encountering resistance and restore said finger to projected position when resistance to movement terminates.

2. Apparatus according to claim 1 in which said operation portion has a distal end parallel to said platen.

3. Apparatus according to claim 1 in which said second non-circular portion has an extended length to guide sliding movement of said finger when encountering resistance to upward movement.

4. Apparatus according to claim 1 in which at least one said hole is of cruciform shape.

* * * * *